US012307642B2

(12) United States Patent
Sharma et al.

(10) Patent No.: US 12,307,642 B2
(45) Date of Patent: May 20, 2025

(54) HIGH-CONTRAST ULTRAVIOLET FLUORESCENCE IMAGING SYSTEMS AND METHODS FOR PIXEL-LEVEL DETECTION OF CRUDE OIL IN DRILL CUTTINGS

(71) Applicant: Schlumberger Technology Corporation, Sugar Land, TX (US)

(72) Inventors: Richa Sharma, Cambridge, MA (US); Karim Bondabou, Montpellier (FR); Matthias Francois, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/719,961

(22) PCT Filed: May 25, 2023

(86) PCT No.: PCT/US2023/023559
§ 371 (c)(1),
(2) Date: Jun. 14, 2024

(87) PCT Pub. No.: WO2023/230247
PCT Pub. Date: Nov. 30, 2023

(65) Prior Publication Data
US 2024/0420299 A1    Dec. 19, 2024

Related U.S. Application Data

(60) Provisional application No. 63/365,444, filed on May 27, 2022.

(51) Int. Cl.
G06K 9/00       (2022.01)
E21B 49/00      (2006.01)
(Continued)

(52) U.S. Cl.
CPC .......... *G06T 7/0002* (2013.01); *E21B 49/005* (2013.01); *G06T 7/11* (2017.01);
(Continued)

(58) Field of Classification Search
CPC ..................... G06T 7/0002; G06T 7/11; G06T 2207/10024; G06T 2207/10056;
(Continued)

(56) References Cited

U.S. PATENT DOCUMENTS

2004/0104355 A1    6/2004   DiFoggio
2012/0038905 A1    2/2012   Balbuena
(Continued)

FOREIGN PATENT DOCUMENTS

CN      111089852 A      5/2020

OTHER PUBLICATIONS

Huo, Fengcai, et al. "Novel lithology identification method for drilling cuttings under PDC bit condition." Journal of Petroleum Science and Engineering 205 (2021): 108898. (Year: 2021).*
(Continued)

Primary Examiner — Jonathan S Lee
(74) Attorney, Agent, or Firm — Jeffrey D. Frantz

(57) ABSTRACT

Systems and methods are provided for imaging drill cuttings, which employ a UV source including a UV LED, which is configured to illuminate a sample volume with UV radiation that interacts with oil-bearing cuttings to cause fluorescence emission. A camera system is configured to capture at least one image of the cuttings based on fluorescence emission. In another aspect, methods are provided for characterizing oil content in drill cuttings that involve capturing at least one WE image of the cuttings illuminated by white light, capturing at least one UV image of the cuttings based on fluorescence emission from UV radiation, processing the at least one WE image to determine a first pixel count
(Continued)

for all cuttings, processing the at least one UV image to determine a second pixel count for oil-bearing cuttings, and determining a parameter representing oil content of the cuttings based on the first and second pixel counts.

19 Claims, 13 Drawing Sheets

(51) Int. Cl.
*G06T 7/00* (2017.01)
*G06T 7/11* (2017.01)
*G06V 10/26* (2022.01)
*G06V 20/70* (2022.01)

(52) U.S. Cl.
CPC .............. *G06V 10/26* (2022.01); *G06V 20/70* (2022.01); *E21B 2200/20* (2020.05); *E21B 2200/22* (2020.05); *G06T 2207/10024* (2013.01); *G06T 2207/10056* (2013.01); *G06T 2207/10064* (2013.01); *G06T 2207/20081* (2013.01); *G06T 2207/20084* (2013.01)

(58) Field of Classification Search
CPC . G06T 2207/10064; G06T 2207/20081; G06T 2207/20084; G06V 20/70; G06V 10/26; E21B 49/005; E21B 2200/20; E21B 2200/22
USPC ........................................................ 382/109
See application file for complete search history.

(56) References Cited

U.S. PATENT DOCUMENTS

2015/0301012 A1   10/2015   Quevedo-Cubillos
2017/0298726 A1   10/2017   Smith
2021/0248428 A1    8/2021   Sharma

OTHER PUBLICATIONS

Wang, Jiyuan, et al. "Recognition of rock images and quantification of oil content using deep residual neural networks." Proceedings of the 2021 4th International Conference on Signal Processing and Machine Learning. 2021. (Year: 2021).*
Saxena, Nishank, et al. "Application of deep learning for semantic segmentation of sandstone thin sections." Computers & Geosciences 152 (2021): 104778. (Year: 2021).*
Geddes, Chris D., et al. "Hydrocarbon fluid inclusion fluorescence: a review." Reviews in Fluorescence 2007 (2009): 299-334. (Year: 2009).*
Gupta, Ishank, et al. "Looking ahead of the bit using surface drilling and petrophysical data: Machine-learning-based real-time geosteering in volve field." SPE Journal 25.02 (2020): 990-1006. (Year: 2020).*
Xue, Dongjie. "Fractal Algorithm of Recognization and Reconstruction of Pore Structure Using AI Technology." Fractal Algorithm and Its Application in Rock Mechanics. Singapore: Springer Singapore, 2022. 33-73. (Year: 2022).*
Nightsea, Image Subtraction to Isolate 'Pure' Fluorescence, 2021, pp. 1-2, https://web.archive.org/web/20210122024433/https://nightsea.com/articles/image-subtraction-fluorescence/ (Year: 2021).*
Otsu, N. "A threshold selection method from gray-level histograms". IEEE Transactions on Systems, Man, and Cybernetics: Systems, 9 (1): 62-66, 1979.

* cited by examiner

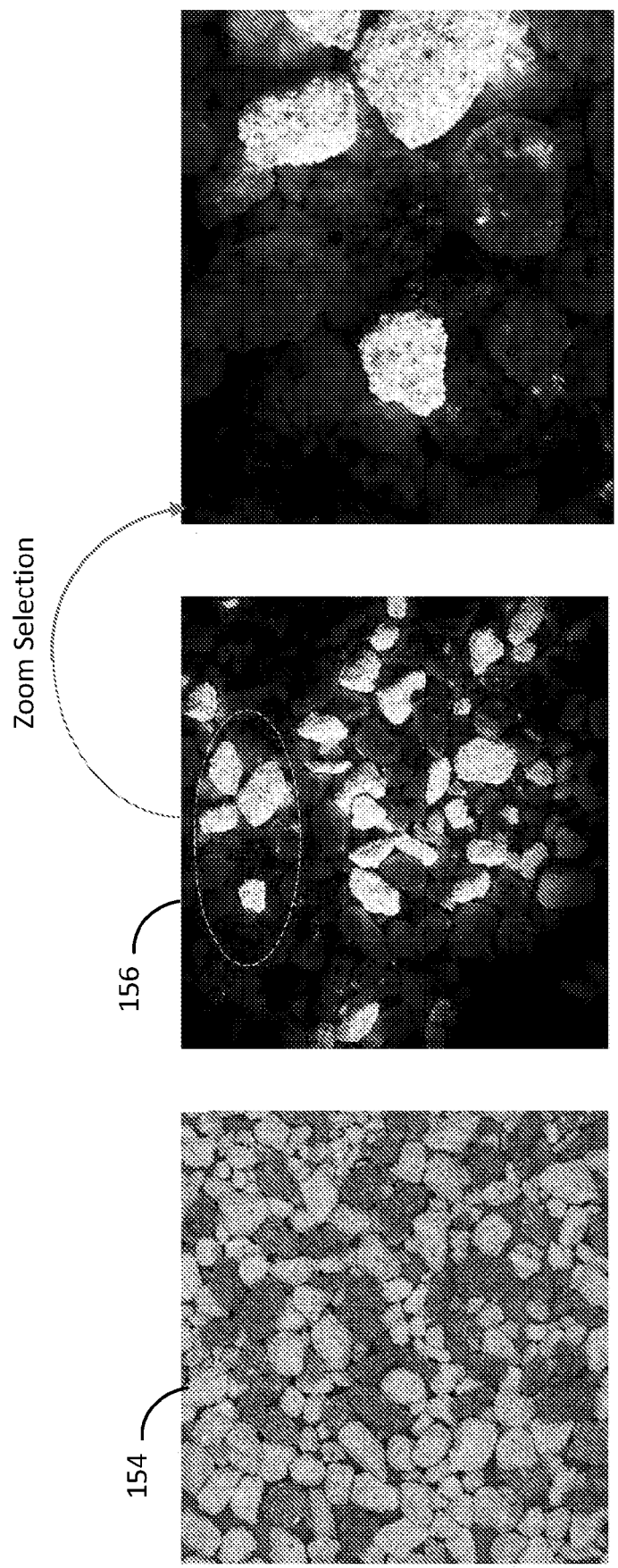

HIGH-CONTRAST ULTRAVIOLET FLUORESCENCE IMAGING SYSTEMS AND METHODS FOR PIXEL-LEVEL DETECTION OF CRUDE OIL IN DRILL CUTTINGS

CROSS REFERENCE PARAGRAPH

This application is the National Stage Entry of International Application No. PCT/US2023/023559, filed May 25, 2023, which claims the benefit of U.S. Provisional Application No. 63/365,444, entitled "HIGH-CONTRAST ULTRAVIOLET FLUORESCENCE IMAGING SYSTEMS AND METHODS FOR PIXEL-LEVEL DETECTION OF CRUDE OIL IN DRILL CUTTINGS," filed May 27, 2022. Each of the above disclosures is hereby incorporated herein by reference.

BACKGROUND

1. Field

The present disclosure relates to systems and methods that acquire surface measurements at wellsites as part of mud-logging activities.

2. State of the Art

Mud-logging activities can employ fluid analysis to provide an indication of potential success in locating oil-bearing formation rock while drilling. Commonly, the mud-logging activities employ Infrared (IR) spectrometry measurements. However, IR is limited by challenges related to the overlapping of absorption bands and saturation of the signal due to the high absorptivity of crude petroleum. On the other hand, efforts on advancing the fluorescence-based methods have considered two performance criteria: high sensitivity and faster measurements. Unfortunately, the UV fluorescence imaging that has been used for the past sixty years for the detection of crude oil during mud-logging activities does not score well on either criterion. The legacy detection system, called Fluoroscope, provides an eyepiece window to view the interaction of high-power UV radiation and drill cuttings, but it suffers from low robustness and bulky apparatus. The Fluoroscope typically provides weak contrast images which are of limited use for reliably applying modern machine learning tools for the detection of oil in drill cuttings. Furthermore, the UV radiation emitted by the mercury-based bulbs of the Fluoroscope can pose high health and safety risks for the operator. Hence, the Fluoroscope is not suitable for integration into automated mud-logging workflows at wellsites.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments, an imaging system is provided for use with drill cuttings. The imaging system includes an ultraviolet (UV) source including a UV light-emitting diode. The UV source is configured to illuminate a sample volume with UV radiation that interacts with crude oil bound to drill cuttings located in the sample volume to cause fluorescence emission of photons in the visible region of the electromagnetic spectrum. The imaging system also includes a camera system including an image sensor. The camera system is configured to capture at least one image of drill cuttings located in the sample volume based on fluorescence emission from the drill cuttings.

In embodiments, the UV source illuminates the sample volume with UV radiation within at least one predefined UV wavelength band that interacts with crude oil bound to drill cuttings located in the sample volume to cause fluorescence emission of photons in the visible region of the electromagnetic spectrum.

In embodiments, the UV light-emitting diode can be configured to emit UV radiation in a UV wavelength band between 265 nm and 400 nm, for example with peak intensity at the wavelength of 365 nm.

In embodiments, the UV source can further include an optical bandpass filter configured to transmit UV radiation within at least one predefined UV wavelength band and block other UV wavelength bands. The at least one predefined UV wavelength band can interact with crude oil bound to drill cuttings located in the sample volume to cause fluorescence emission of photons in the visible region of the electromagnetic spectrum. In embodiments, the optical bandpass filter can be configured to transmit UV radiation in a wavelength band between 265 nm and 400 nm and substantially block transmission of UV radiation for wavelengths outside the wavelength band for transmission. In embodiments, the wavelength band for transmission of the optical bandpass filter extends over a narrow UV wavelength range of 100 nm or less (i.e., the narrow UV wavelength range does not cover more than 100 nm).

In embodiments, the imaging system can further include an optical filter in the optical path between the sample volume and the camera system.

In embodiments, the imaging system can further include a white light source configured to illuminate the sample volume with white light. The camera system can be further configured to capture at least one image of drill cuttings located within the sample volume and illuminated by white light.

In another aspect, the imaging system can be combined with a data processing system for use in mud-logging workflows. The data processing system can be configured to process at least one image of drill cuttings located within the sample volume and illuminated by white light as captured by the imaging system and further process the at least one image arising from fluorescence emission from drill cuttings located in the sample volume as captured by the imaging system in order to quantitively characterize oil content of the drill cuttings.

In embodiments, the data processing system can be configured to
  i) process the at least one image of drill cuttings located within the sample volume and illuminated by white light as captured by the imaging system to determine a first pixel count for all drill cuttings;
  ii) process the at least one image arising from fluorescence emission from drill cuttings located in the sample volume as captured by the imaging system to determine a second pixel count for oil-bearing drill cuttings; and
  iii) determine a parameter representing oil content of the drill cuttings based on the first pixel count and the second pixel count.

In another aspect, a method of characterizing oil content in drill cuttings is provided, which involves:
  capturing at least one image of drill cuttings illuminated by white light;

capturing at least one image of drill cuttings based on fluorescence emission arising from illumination by UV radiation; and configuring a data processing system to perform operations that include
i) processing the at least one image of drill cuttings illuminated by white light to determine a first pixel count for all drill cuttings;
ii) processing the at least one image of the drill cuttings based on fluorescence emission to determine a second pixel count for oil-bearing drill cuttings; and
iii) determining a parameter representing oil content of the drill cuttings based on the first pixel count and the second pixel count.

In embodiments, the data processing system of the present disclosure can be configured to determine the parameter representing oil content of the drill cuttings based on the ratio of the second pixel count over the first pixel count.

In embodiments, the data processing system of the present disclosure can employ a first machine learning model to determine the first pixel count for all drill cuttings, and the data processing system can employ a second machine learning model to determine the second pixel count for oil-bearing drill cuttings.

In embodiments, the first machine learning can be trained to determine the first pixel count for all drill cuttings from images of drill cuttings of different textures, colors, and oils of different API and associated label data, and the second machine learning can be trained to determine the second pixel count for oil-bearing drill cuttings from images of drill cuttings of different textures, colors, and oils of different API and associated label data.

In embodiments, the first machine learning model can be trained to determine the first pixel count for all drill cuttings from label data derive from binarization of images of drill cuttings illuminated by white light, and the second machine learning model can be trained to determine the second pixel count for oil-bearing drill cuttings from label data derive from binarization of UV images illuminated by UV radiation that causes fluorescence emission from oil-bearing drill cuttings.

In embodiments, the first machine learning can be a convolutional encoder-decoder neural network trained to determine the first pixel count for all drill cuttings from an image of drill cuttings illuminated by white light, and/or the second machine learning model can be a convolutional encoder-decoder neural network trained to determine the second pixel count for oil-bearing drill cuttings from an image of drill cuttings illuminated by UV radiation that causes fluorescence emission from oil-bearing drill cuttings.

In embodiments, the at least one image of drill cuttings illuminated by white light and the at least one image of the drill cuttings based on fluorescence emission can be captured by an integrated WL/UV imaging system having a white light source and UV source configured to illuminate a sample volume and a camera system configured to acquire images of drill cuttings located in the sample volume and illuminated by either the white light source or the UV source without moving the drill cuttings.

In other embodiments, the at least one image of drill cuttings illuminated by white light and the at least one image of the drill cuttings based on fluorescence emission can be captured by a white light imaging system and UV imaging system that are separate and distinct from one another.

In embodiments, the integrated WL/UV imaging system (or the UV imaging system) can include a UV source including a UV light-emitting diode and a camera system including an image sensor. The UV source can be configured to illuminate a sample volume with UV radiation that interacts with crude oil bound to drill cuttings located in the sample volume to cause fluorescence emission of photons in the visible region of the electromagnetic spectrum. The imaging system also includes a camera system including an image sensor. The camera system is configured to capture at least one image of drill cuttings located in the sample volume based on fluorescence emission from the drill cuttings.

In embodiments, the UV source can be configured to illuminate the sample volume with at least one predefined UV wavelength band that interacts with crude oil bound to drill cuttings located in the sample volume to cause fluorescence emission of photons in the visible region of the electromagnetic spectrum.

In embodiments, the UV light-emitting diode can be configured to emit UV radiation in a UV wavelength band between 265 nm and 400 nm, for example with peak intensity at the wavelength of 365 nm.

In embodiments, the UV source can further include an optical bandpass filter configured to transmit UV radiation within at least one predefined UV wavelength band and block other UV wavelength bands. The at least one predefined UV wavelength band can interact with crude oil bound to drill cuttings located in the sample volume to cause fluorescence emission of photons in the visible region of the electromagnetic spectrum. In embodiments, the optical bandpass filter can be configured to transmit UV radiation in a wavelength band between 265 nm and 400 nm and substantially block transmission of UV radiation for wavelengths outside the wavelength band for transmission. In embodiments, the wavelength band for transmission of the optical bandpass filter extends over a narrow UV wavelength range of 100 nm or less (i.e., the narrow UV wavelength range does not cover more than 100 nm).

In embodiments, the UV source can further include an optical bandpass filter configured to transmit UV radiation within at least one predefined UV wavelength band and block other UV wavelength bands. The at least one predefined UV wavelength band can interact with crude oil bound to drill cuttings located in the sample volume to cause fluorescence emission of photons in the visible region of the electromagnetic spectrum.

In embodiments, the optical bandpass filter can be configured to transmit UV radiation in a wavelength band centered around 365 nm and substantially block transmission of UV radiation for wavelengths outside the wavelength band for transmission. In embodiments, the wavelength band for transmission of the optical bandpass filter can extend over a narrow UV wavelength range of 100 nm or less (i.e., the narrow UV wavelength range does not cover more than 100 nm).

In embodiments, the integrated WL/UV imaging system (or the UV imaging system) can further include an optical filter in the optical path between the sample volume and the camera system.

BRIEF DESCRIPTION OF THE DRAWINGS

FIG. 3 illustrates an exemplary white light (WL) image of a sample of drill cuttings captured by the imaging system of FIG. 2A.

FIG. 4A illustrates an exemplary ultraviolet (UV) image of the same sample of drill cuttings of FIG. 3 as captured by the imaging system of FIG. 2A.

FIG. 4B illustrates a zoom-selected portion of the exemplary (UV) image of FIG. 4A.

DETAILED DESCRIPTION OF THE PREFERRED EMBODIMENTS

Crude oils are complex mixtures of organic compounds, including saturates, aromatic compounds, polar compounds, and asphaltene. Most downhole spectroscopic fluid measurements are costly and tedious. They are particularly challenging due to the simultaneous presence of varying amounts of gases such as $CO_2$, CO, $O_2$, N2, $H_2$, $CH_4$, etc. The present disclosure is motivated by the long-standing need of acquiring surface measurements at a wellsite as part of the mud-logging activities. This capability can bring huge gains by enabling automation and optimization of mud-logging workflows based on rapid measurements on drill cuttings.

Furthermore, the present disclosure relies on the visible fluorescence of crude oils. Visible fluorescence is initiated by electron energy absorption when excited by ultraviolet (UV) radiation. Photons of UV radiation collide with the electrons promoting electron excitation from the ground level to a higher energy level (excited state). Subsequently, the electronic energy is released through fluorescence during deactivation back to the ground state. Unsaturated organic structures which contain pi ($\pi$) electrons such as aromatics and conjugated polyenes are primarily responsible for the visible fluorescence of crude oils.

Figure 1:
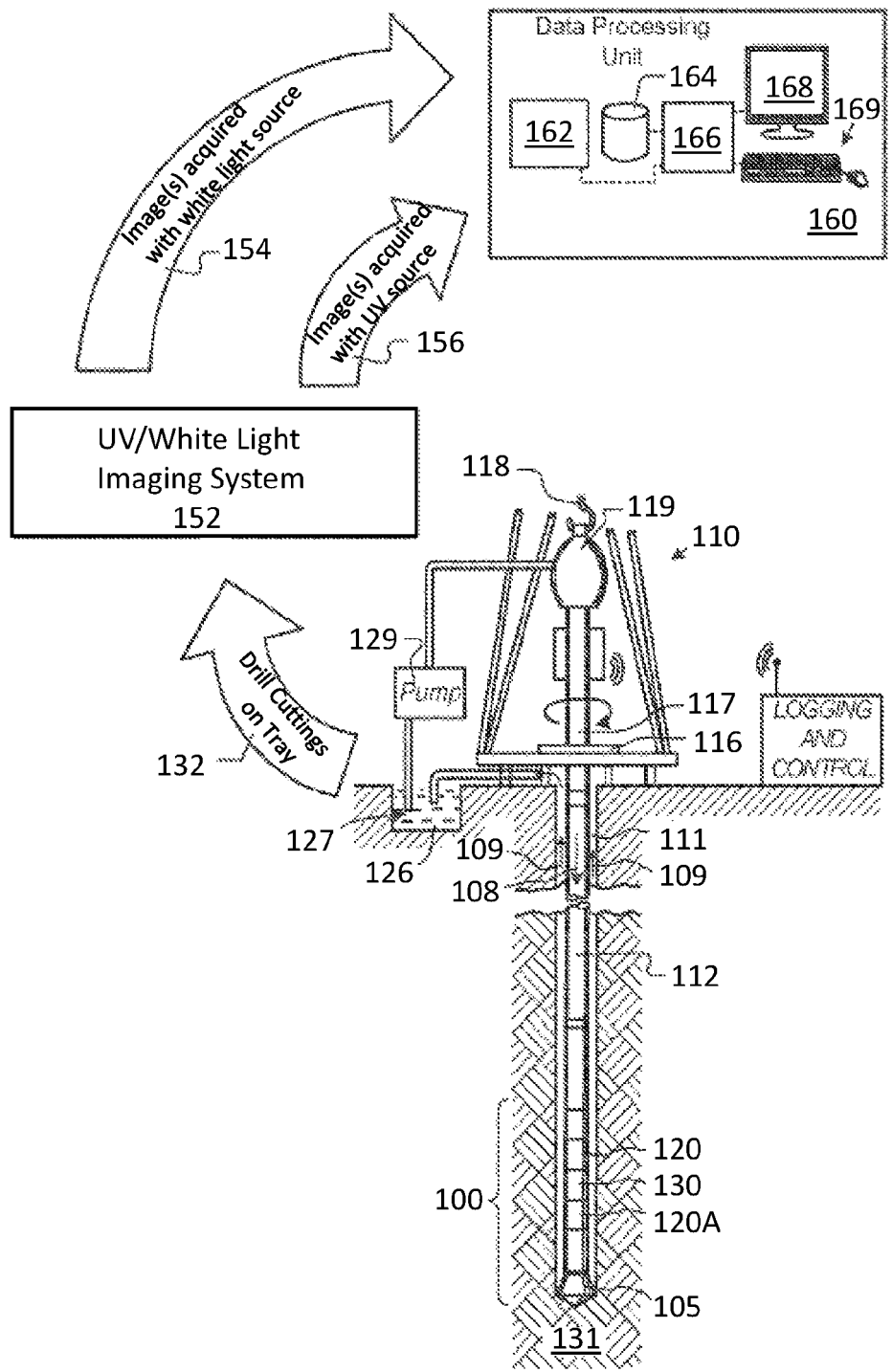
FIG. 1 is a schematic diagram illustrating an exemplary wellsite that embodies aspects of the present disclosure.

FIG. 1 illustrates a wellsite system in which drill cuttings from a hydrocarbon-bearing rock formation are collected and analyzed to characterize the oil content of the drill cuttings (and thus the oil content of the hydrocarbon-bearing rock formation corresponding to the drill cuttings) in accordance with the present disclosure. In this system, the wellsite is depicted on land (onshore). In other embodiments, the wellsite could be offshore (employing a similar platform above water). In the illustrative wellsite system, a borehole 111 is formed that traverses a hydrocarbon-bearing subsurface rock formation 131 by rotary drilling in a manner that is well known. A drill string 112 is suspended within the borehole 111 and has a bottom hole assembly 100 that includes a drill bit 105 at its lower end. The surface system includes a platform and derrick assembly 110 positioned over the borehole 111. The assembly 110 includes a rotary table 116, kelly 117, hook 118, and rotary swivel 119. The drill string 112 is rotated by the rotary table 116, energized by means not shown, which engages the kelly 117 at the upper end of the drill string 112. The drill string 112 is suspended from the hook 118 through the kelly 817. The rotary swivel 119 permits rotation of the drill string 112 relative to the hook 118. As is well known, a top drive system could alternatively be used.

In the example embodiment of FIG. 1, the surface system further includes drilling fluid or mud 126 that is stored in a pit 127 formed at the wellsite. A pump 129 delivers the drilling fluid 126 to the interior of the drill string 112 via a port in the swivel 119, causing the drilling fluid to flow downwardly through the drill string 112, as indicated by the directional arrow 108. The drilling fluid exits the drill string 112 via ports in or near the drill bit 105, and then circulates upwardly through the annulus region between the outside of the drill string 112 and the wall of the borehole 111, as indicated by the directional arrows 109. In this well-known manner, the drilling fluid lubricates the drill bit 105 and carries drill cuttings (which are small pieces of rock that break away due to the action of the drill bit 105) up to the surface as the drilling fluid 126 is returned to the pit 127 for recirculation. The bottom hole assembly 100 of the illustrated embodiment can include modules for downhole measurements (such as a logging-while-drilling (LWD) modules 120, 120A and a measuring-while-drilling (MWD) module 130), a rotary-steerable system and motor, and the drill bit 105. Embodiments of the subject disclosure can also use directional drilling.

According to some embodiments, drill cuttings (also referred to herein as cuttings) can be extracted from the drilling fluid 126 that returns to the surface (for example, by a shaker), cleaned and/or otherwise prepared for analysis, and placed on a sample tray (labeled 132 in FIG. 1). A UV/White Light Imaging System 152 is configured to acquire at least one image of the cuttings on the sample tray while illuminating the cuttings on the sample tray with white light. Such image(s) is labeled 154 in FIG. 1 and referred to as a white light image or WL image herein. The UV/White Light Imaging System 152 is also configured to acquire at least one image 156 of the cuttings on the sample tray while illuminating the cuttings on the sample tray with ultraviolet (UV) radiation. UV radiation is a form of electromagnetic radiation with wavelength from 10 nm to 400 nm, shorter than that of visible light, but longer than X-rays. Such image(s) is labeled 156 in FIG. 1 and referred to as a UV image herein. Both the WL image(s) 154 and UV image(s) 156 are processed and interpreted by a data processing unit 160 in order to characterize the oil content of the cuttings on the sample tray (and thus characterize the oil content of the hydrocarbon-bearing subsurface rock formation 131 or part thereof from which they originated). The data processing unit 160 includes one or more central processing units 162, storage system 164, communications and input/output modules 166, a user display 168, and a user input system 169. Storage system 164 can include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or another memory device.

According to some embodiments, the Imaging System 152 and the data processing unit 160 can be located at the wellsite, such as a logging truck or at some other location at the wellsite. In such cases, the image acquisition and image processing operations as described herein can be carried out in real-time during the drilling process. Providing this type of rapid formation evaluation has potential benefits in well-completion decisions, for example, for the optimal placement of perforations and hydraulic fractures. There may also be potential applications for geosteering of the drill bit 105.

In other embodiments, the data processing unit 160 and/or the Imaging System 152 can be located at one or more locations remote from the wellsite, such as at a remote laboratory. At a remote laboratory, additional and more accurate/complex characterization methods can be employed to provide better accuracy and resolution of the formation properties.

Figure 2A:
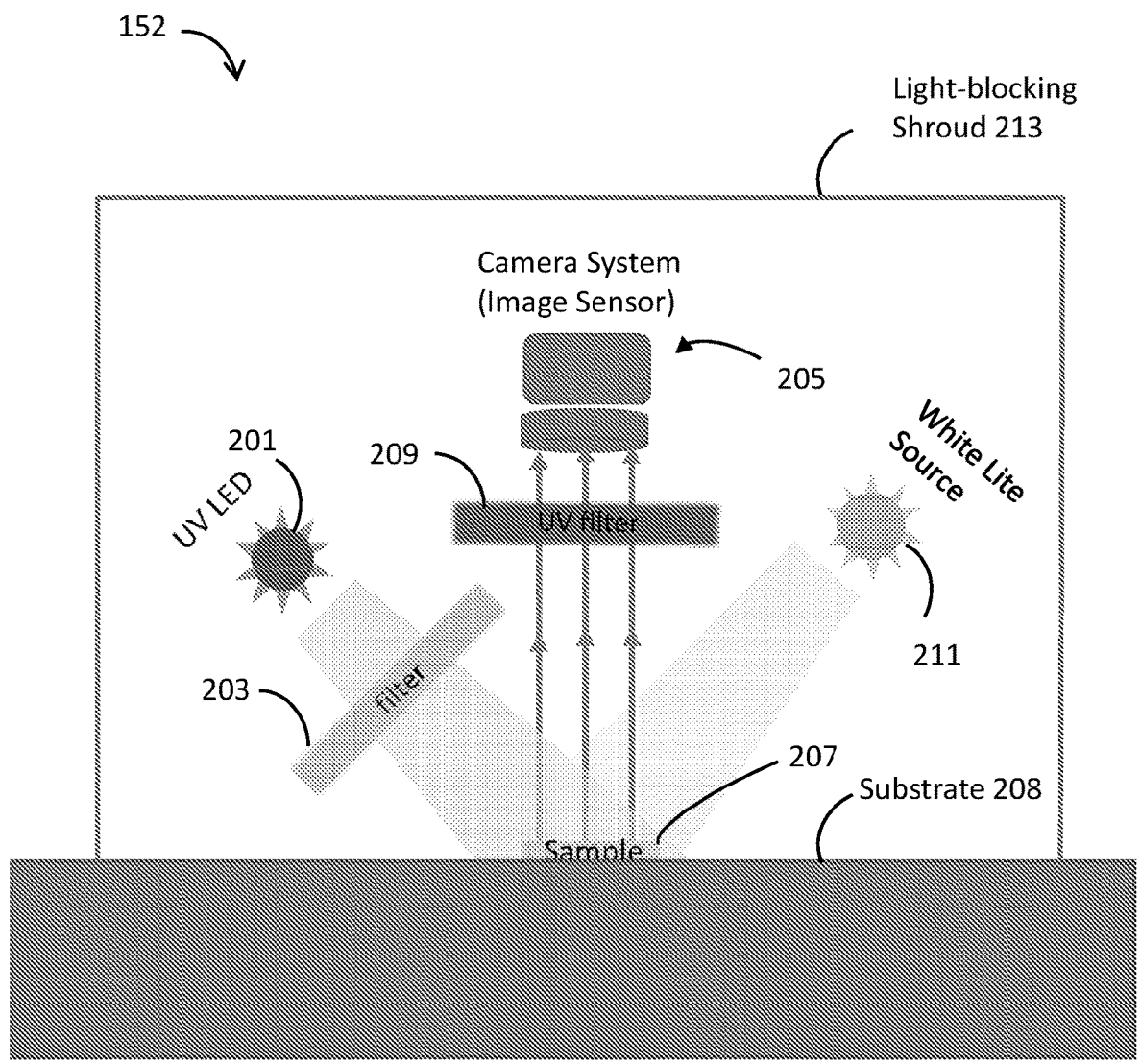
FIG. 2A is a schematic diagram of an exemplary imaging system that can used as part of mud-logging workflows according to the present disclosure.
Figure 2B:
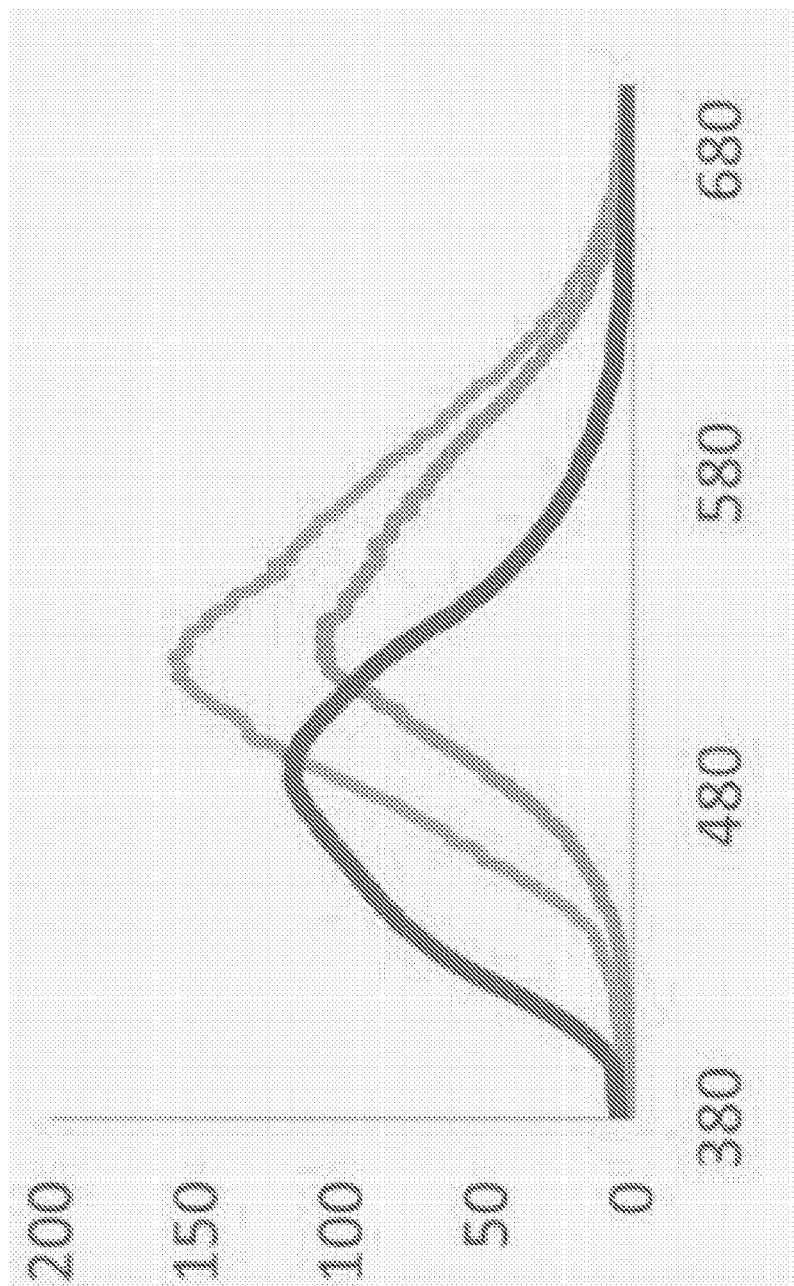
FIG. 2B depicts plots representing the fluorescence spectra of different crude oils in the visible region.

An example embodiment of the Imaging System 152 is shown in FIG. 2A, which includes a UV light source that includes a UV light-emitting diode 201 and an optical bandpass filter 203 that cooperate to direct UV radiation within at least one predefined UV wavelength band to a sample volume that coincides with the field of view of a camera system 205. The optical bandpass filter 203 is positioned in the optical path between the UV light-emitting diode 201 and the sample volume and is configured to transmit UV radiation within the at least one predefined UV wavelength band while blocking other UV wavelength bands. The UV light-emitting diode 201 emits UV radiation within one or more UV wavelength bands that encompass or correspond to the at least one predefined UV wavelength band of the optical bandpass filter 203. The UV radiation emitted by the UV light-emitting diode 201 is directed to the optical bandpass filter 203 for optical filtering and illumination of the sample volume with UV radiation within the at least one predefined UV wavelength band as transmitted by the optical bandpass filter 203. The camera system 205 includes an image sensor (e.g., CCD or CMOS image sensor) and lens that are configured to capture an image of a sample 207 (i.e., cuttings on the sample tray) that is supported on a substrate 208 and located within the sample volume. An optical filter 209 can be positioned in the optical path between the sample volume (i.e., the location of sample 207) and the camera system 205. The UV radiation within the at least one predefined UV wavelength band that illuminates the sample volume interacts with the cuttings on the sample tray and excites the electrons of the fluorophores in crude oil that is bound to the cuttings, leading to emission mainly in the visible region of the electromagnetic spectrum, as presented in FIG. 2B. The fluorescence spectra of crude oil typically consist of broadband radiation in the visible region. This broadband radiation in the visible region arises from the overlapping emissions from the different fluorophores present in the sample. With the UV LED 201 turned on (and the white light source 211 as described below turned off), the camera system 205 can be configured to capture an image of the visible photons from the sample fluorescence emission, which is referred to herein as a UV image (labeled 156 in FIG. 1).

The Imaging System 152 also includes a white light source 211 (also referred to as a broadband light source) that directs white light (i.e., broadband light within the visible light spectrum) to the sample volume that coincides with the field of view of a camera system 205. In embodiments, the white light source 211 can be an LED white light source. With the white light source 211 turned on (and the UV light-emitting diode 201 turned off), the camera system 205 can be configured to capture an image of sample 207 as illuminated by the white light source 211, which is referred to herein as a white light image or WL image (labeled 154 in FIG. 1).

The Imaging System 152 can also include a light-blocking shroud 213 that can cover the system and block ambient light from passing therethrough, thus eliminating the spectral noise caused by the ambient light that would otherwise negatively affect the imaging operations carried out by the system. In other embodiments, the Imaging System 152 can operate in a dark room with minimal ambient light and the light-blocking shroud 213 can be omitted.

In embodiments, the optical filter 209 is optional and its use can be dependent on the sensitivity of the imaging sensor of the camera system 205. In embodiments, the optical filter 209 can function as a bandpass filter that is configured to pass the fluorescence spectra of the crude oil in the visible spectrum so as not to affect the UV image acquisition by the camera system 205. In embodiments, the bandpass filter 209 can be configured to block UV light from passing therethrough and entering the camera system 205.

Figure 2C:
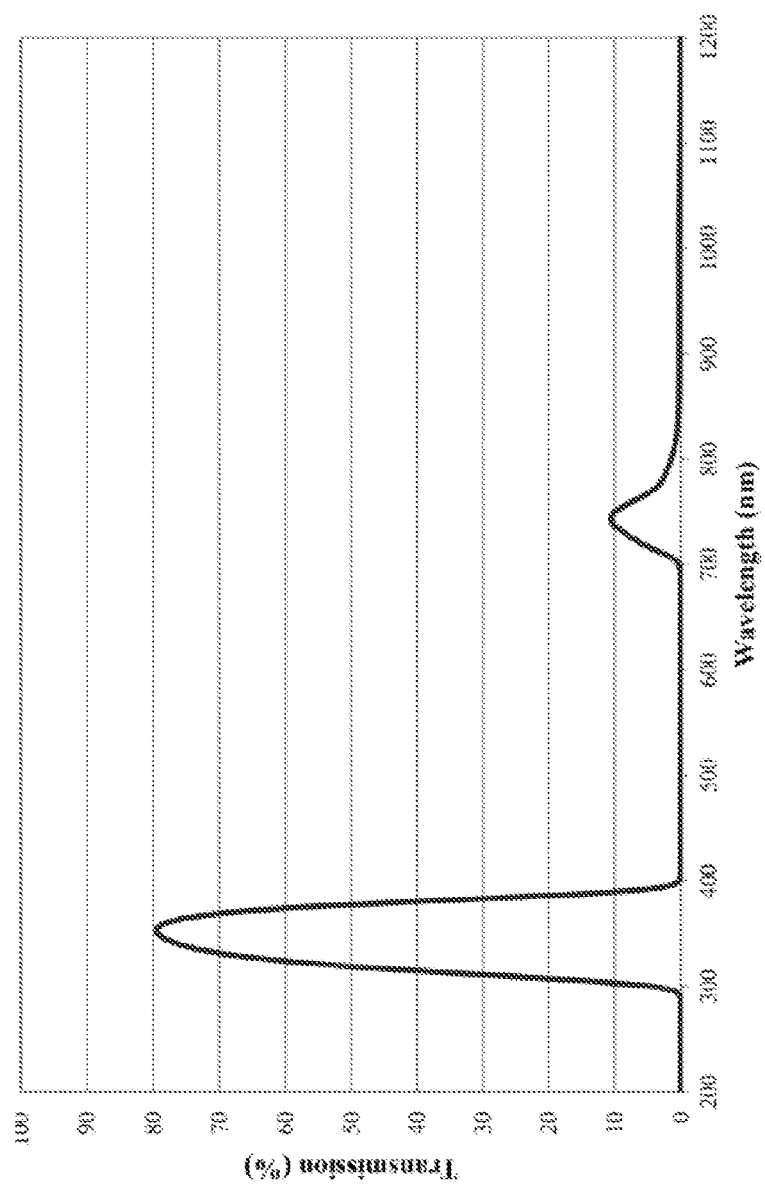
FIG. 2C is a plot that represents the transmittance of an exemplary optical bandpass filter that can be used as part of the imaging system of FIG. 2A.

In embodiments, the UV light-emitting diode 201 can be configured to emit UV radiation in a wavelength band between 265 nm and 400 nm. In embodiments, the UV light-emitting diode 201 can be configured to emit UV radiation in a wavelength band centered around 365 nm with peak intensity at the wavelength of 365 nm. The optical bandpass filter 203 can be configured to transmit UV radiation in a pass UV wavelength band centered (for example, with transmission of greater than 30% and possibly higher) and substantially block transmission of UV radiation for wavelengths outside the pass UV wavelength band for transmission (for example, with transmission of less than 15% and possibly lower). In embodiments, the pass UV wavelength band for transmission of the optical bandpass filter 203 can extend over a narrow UV wavelength range of 100 nm or less (i.e., the narrow UV wavelength range does not cover more than 100 nm) in the UV wavelength band of 265 nm to 400 nm. In embodiments, the optical bandpass filter 203 can provide transmittance as illustrated in the plot of FIG. 2C. In this case, the narrow UV wavelength band for transmission of the optical bandpass filter 203 extends over a narrow UV wavelength range of 100 nm or less centered around 365 nm as shown. Furthermore, the optical bandpass filter 203 substantially blocks transmission of UV radiation for wavelengths outside the pass UV wavelength band for transmission.

The UV light-emitting diode 201 can also emit light in the tail end of the visible spectrum (e.g., visible light at wavelengths between 400 nm and 700 nm). Such light will produce highly variable spectral noise that can negatively affect the imaging operations carried out by the system. In embodiments, the optical bandpass filter 203 can be configured to block the transmission of such light in the tail end of the visible spectrum (e.g., visible light at wavelengths between 400 nm and 700 nm) as illustrated in the optical transmittance of FIG. 2C. This can eliminate the spectral noise produced by such light and improve the contrast in the images of the cuttings acquired by the system.

In embodiments, the camera system 205 can include the model D850 camera sold commercially by Nikon Inc. of Melville, NY with a macro lens.

In embodiments, all of the components of the Imaging System 152 can be sourced or acquired as off-the-shelf components.

FIGS. 3 and 4A illustrate images of cuttings on a sample tray acquired by the Imaging System 152 of FIG. 2A. The cuttings consist of non-oil-bearing (or dry) rock pieces and oil-bearing rock pieces. FIG. 3 illustrates an exemplary WL image 154, while FIG. 4A illustrates an example UV image 156. Note that in the UV image 156 of FIG. 4A, the oil-bearing cuttings are bright and visible under UV irradiation due to the fluorescence from the oil trapped in the surface-accessible pores of the cuttings, while the non-oil-bearing cuttings are not bright and particularly visible in the UV image. FIG. 4B is an image of a zoom-selected part of the UV image 156 of FIG. 4A, which highlights the visible features of the oil-bearing cuttings.

Figure 6:
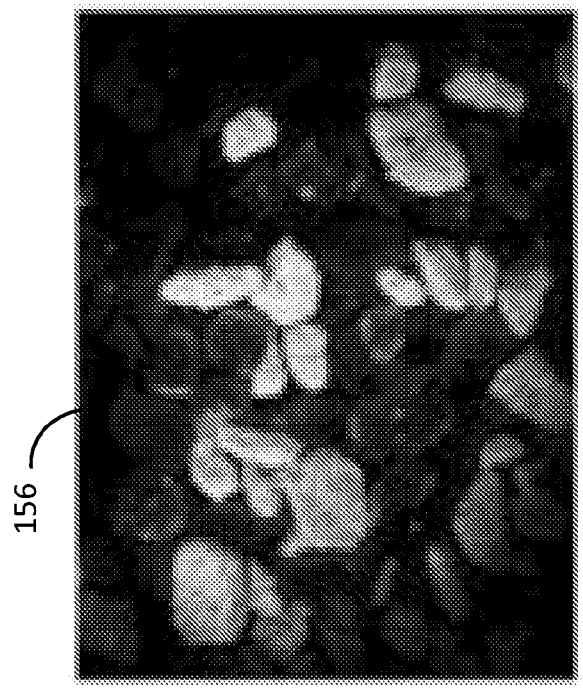
FIG. 6 illustrates an exemplary ultraviolet (UV) image of the same sample of drill cuttings of FIG. 5 as captured by the imaging system of FIG. 2A.
Figure 5:
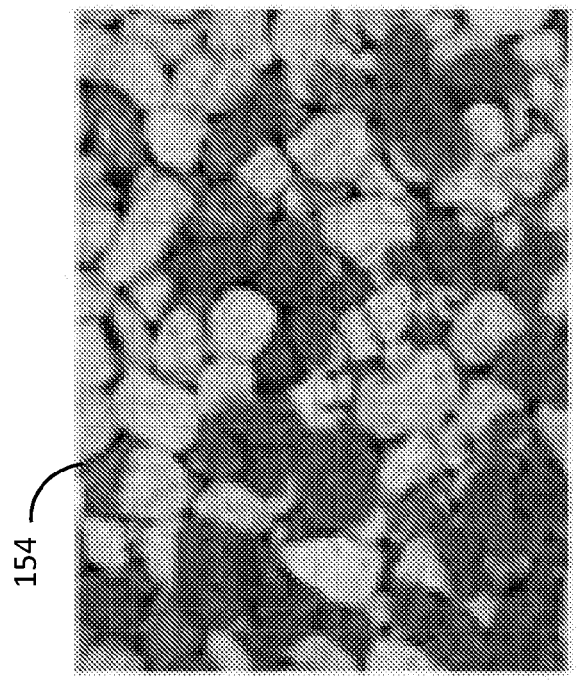
FIG. 5 illustrates an exemplary white light (WL) image of another sample of drill cuttings captured by the imaging system of FIG. 2A.

FIGS. 5 and 6 illustrate images of cuttings on a sample tray acquired by the Imaging System 152 of FIG. 2A. The cuttings consist of non-oil-bearing (or dry) rock pieces and oil-bearing rock pieces. FIG. 5 illustrates an exemplary WL image 154, while FIG. 6 illustrates an example UV image 156. Note that in the UV image 156 of FIG. 6, the oil-bearing cuttings are bright and visible under UV irradiation due to the fluorescence from the oil trapped in the surface-accessible pores of the cuttings.

It is important to note that cuttings mixtures of different colors were used as samples to test the color and reflection variability of the Imaging System 152 of FIG. 2A. Importantly, in the UV images (see FIGS. 4A and 6), the pixels for non-oil-bearing cuttings are dark such that the non-oil-bearing cuttings are not visible; whereby the pixels for oil-bearing cuttings are captured with bright luminescent. Also note that longer exposure times or higher UV power only saturate the detector and do not deteriorate the contrast between the cuttings with and without oil. This contrast is important for rapidly identifying oil-bearing cuttings in mud-logging workflows.

Figure 8:
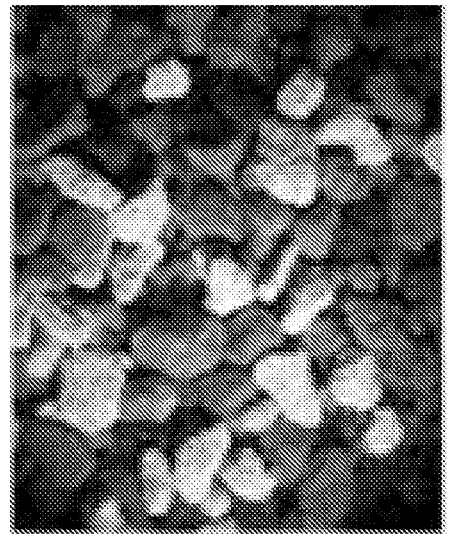
FIG. 8 illustrates an exemplary image of the same sample of drill cuttings of FIG. 7 as captured by an imaging system that employs a UV LED instead of a fluorescent bulb.
Figure 7:
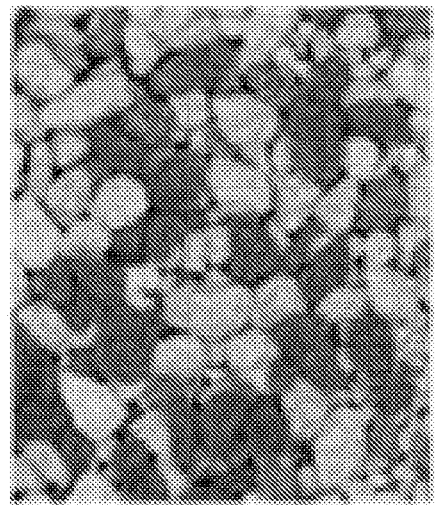
FIG. 7 illustrates an exemplary white light (WL) image of yet another sample of drill cuttings captured by a white light imaging system.

Another option that was considered was to replace the fluorescent bulb of the Fluoroscope with a UV LED for mud-logging oil detection. FIGS. 7 and 8 show the results of this option. FIG. 7 illustrates an exemplary WL image, while FIG. 8 illustrates an example image acquired with the UV LED. Note that by comparing the UV image of FIG. 6 and the image of FIG. 8, in the case that used the UV LED (FIG. 8), the contrast between the cuttings with and without oil is much weaker than the UV image obtained from the system of FIG. 6 (which employs a UV LED and optical passband filter for illuminating the sample).

Figure 10:
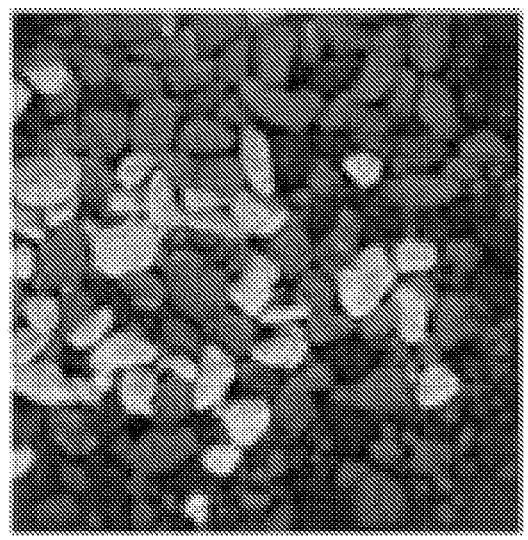
FIG. 10 illustrates an exemplary image of the same sample of drill cuttings of FIG. 9 as captured by an imaging system that employs a UV fluorescent ring light.
Figure 9:
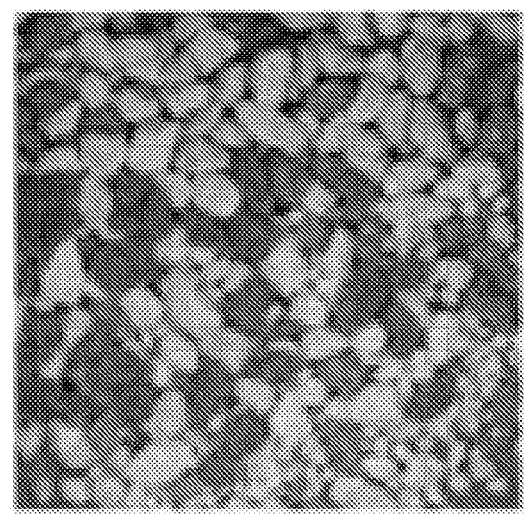
FIG. 9 illustrates an exemplary white light (WL) image of still another sample of drill cuttings captured by a white light imaging system.

Yet another option that was considered was to replace the bulky box of the Fluoroscope by a small UV fluorescent ring light. In principle, this could enable integration of white light and UV light imaging into one unified system. Two limitations make this idea less practical: (i) the presence of mercury in the fluorescent ring light source, and (ii) low-quality data. FIGS. 9 and 10 show the results of this option. FIG. 9 illustrates an exemplary WL image, while FIG. 10 illustrates an example image acquired with the fluorescent ring light (e.g., 356 nm fluorescent ring light). Note that by comparing the UV image of FIG. 6 and the image of FIG. 10, the use of the UV fluorescent ring light (FIG. 10) produces a contrast between the cuttings with and without oil that is much weaker than the UV image obtained from the system of FIG. 6 (which employs a UV LED and optical passband filter for illuminating the sample). This lack of contrast is a significant barrier to making high-confidence predictions for oil based on modern machine learning methods (or even manual data processing).

Figure 12:
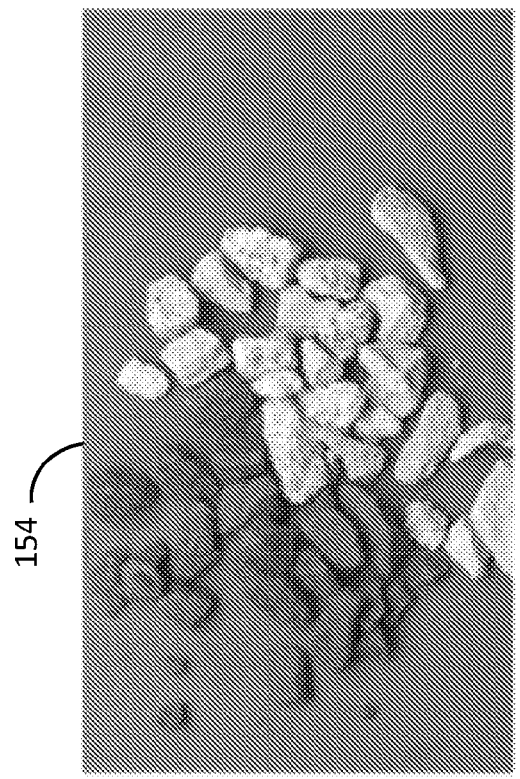
FIG. 12 illustrates an exemplary UV image of the same sample of drill cuttings of FIG. 11 as captured by a digital microscope configured with a UV light-emitting diode, optical bandpass filter, optical filter, and image sensor similar to parts of the system of FIG. 2A.
Figure 11:
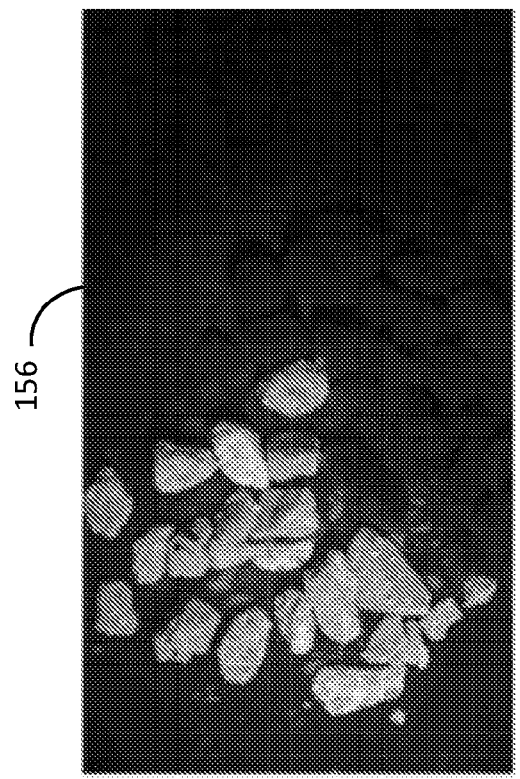
FIG. 11 illustrates an exemplary white light (WL) image of another sample of drill cuttings captured by a white light imaging system.

In other embodiments, separate imaging systems can be used to acquire the WL image(s) and the UV image(s) of the cuttings. For example, an imaging system can be configured with a WL source, optical filter, and camera/image sensor similar to parts of the system 152 of FIG. 2A and used for capturing the WL image(s) of a cuttings sample. A digital microscope (such as a digital microscope sold commercially by Sanxo of Budapest, Hungary) can be configured with a UV light-emitting diode, optical bandpass filter, optical filter, and camera/image sensor similar to parts of the system 152 of FIG. 2A and used for capturing the UV image(s) of the same cutting sample. The digital microscope can be used with or without a light-blocking shroud. When used without a light-blocking shroud, any light in the ambient environment of the microscope can be turned off or dimmed and the acquisition time for the imaging can be controlled, for example to less than 1 second, in order to decrease ambient noise. FIGS. 11 and 12 show the results of this option. FIG. 11 illustrates an exemplary WL image, while FIG. 12 illustrates an example UV image acquired with a digital microscope without a light-blocking shroud. Note that by comparing the UV image of FIG. 6 and the UV image of FIG. 12, the contrast between the cuttings with and without oil is very similar for both options.

In embodiments, the data processing unit 160 of FIG. 1 can be configured with imaging processing functionality (referred to herein as an "Imaging Toolbox") that processes and interprets the WL image(s) and UV image(s) that are acquired by the workflow in order to characterize the oil content of cuttings, and thus characterize the oil content of the hydrocarbon-bearing subsurface rock formation 131 or part thereof from which the cuttings originated. In embodiments, the Imaging Toolbox capitalizes on the high-quality data of the UV image(s).

Figure 13:
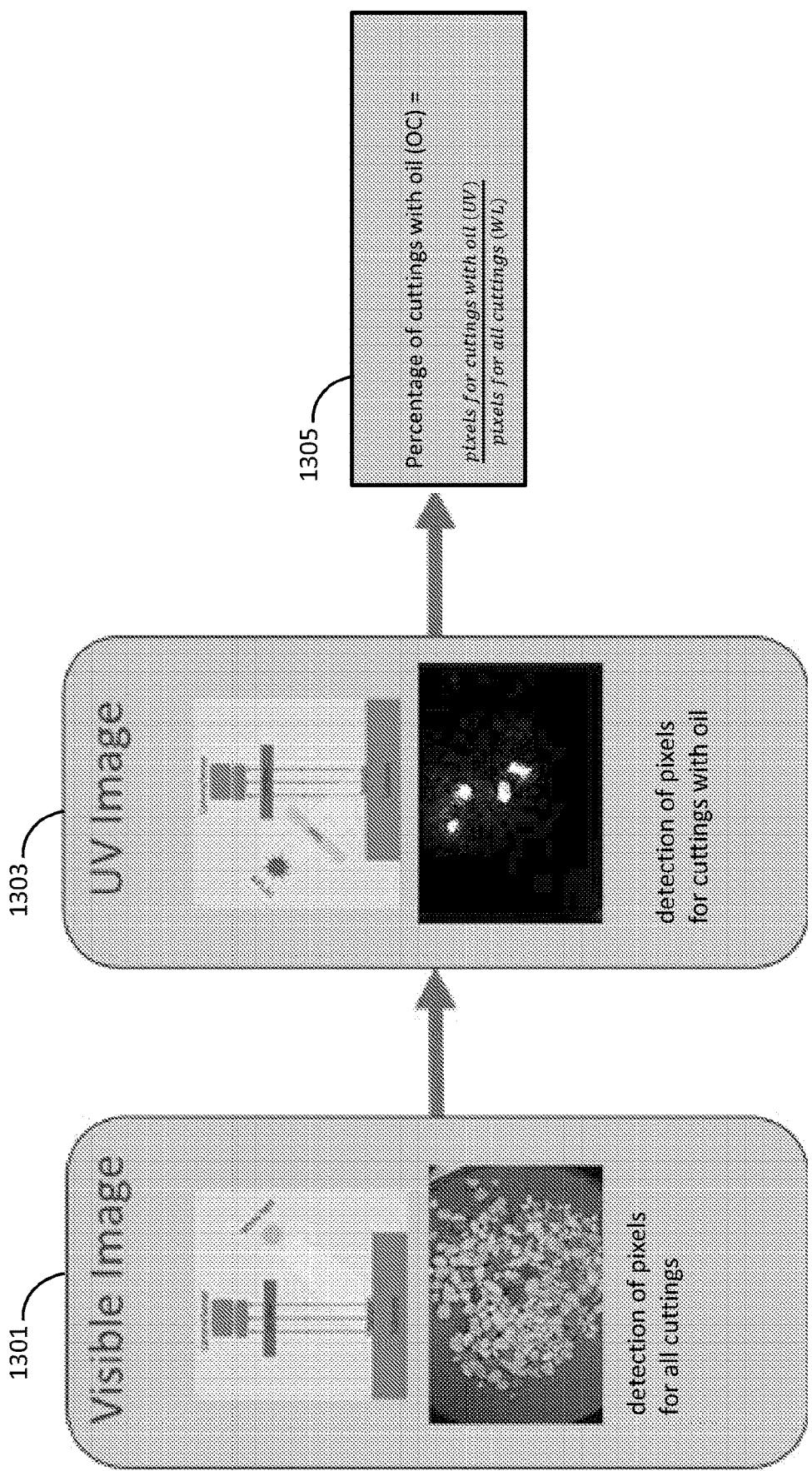
FIG. 13 is a schematic diagram of an exemplary workflow that employs correlative imaging processing of WL image(s) and UV image(s) to quantitatively characterize the oil content of drill cuttings.

In embodiments, the Imaging Toolbox can be configured to enable pixel-level detection of oil from cuttings suitable for a fully automated workflow. The primary goal of the Imaging Toolbox is to provide correlative image processing of the WL image(s) and UV image(s) to quantitatively characterize the oil content of the cuttings as illustrated in FIG. 13. The workflow includes the following steps: In step 1301, one or more WL image(s) of the cuttings are obtained whereby the cuttings are illuminated by white light. In step 1303, one or more UV image(s) of the cuttings are obtained whereby the cuttings are illuminated by UV radiation to produce visible fluorescence of the crude oils trapped at the surface of the cuttings that results in oil-bearing cuttings with high contrast. In step 1305, the WL image(s) of 1301 and the UV image(s) of 1303 are processed by correlative image processing of the WL and UV images to provide a quantitative assessment of the oil-bearing cuttings. In embodiments, the operations of 1305 can involve processing the WL image(s) to determine the pixel count (i.e., number of pixels) for all cuttings (both oil-bearing and non-oil-bearing cuttings), processing the UV image(s) to determine the pixel count (i.e., number of pixels) for oil-bearing cuttings, and determining a parameter representing oil content of the cuttings based on the ratio of the pixel count for oil-bearing cuttings relative to the pixel count for all cuttings.

Figure 14:
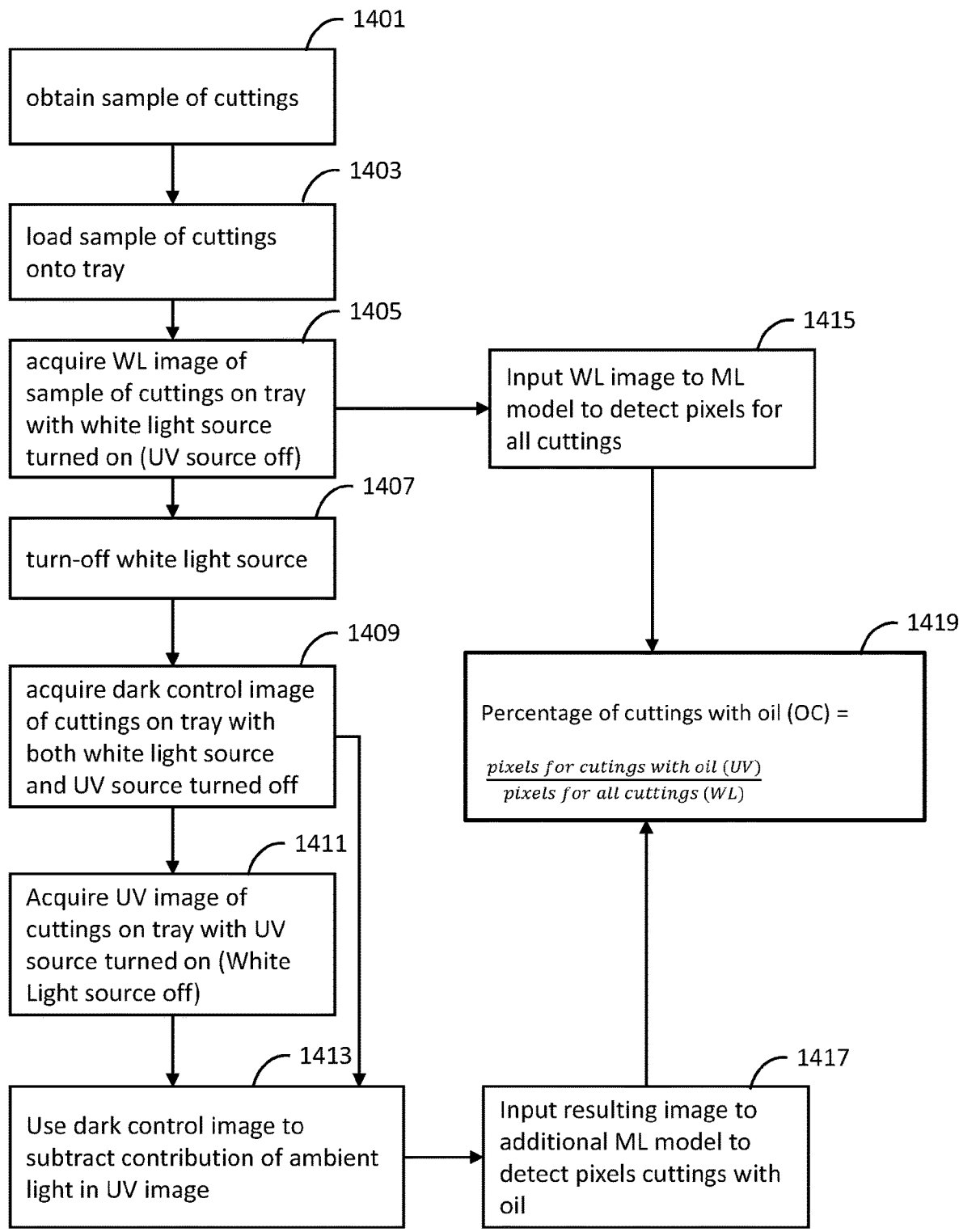
FIG. 14 is a flowchart of an exemplary experimental workflow that follows the general workflow of FIG. 13 using the imaging system of FIG. 2A.

FIG. 14 is a flowchart of an exemplary experimental workflow that follows the general workflow of FIG. 13 using the Imaging System 152 of FIG. 2A.

The workflow begins in block 1401 by obtaining a sample of cuttings. In embodiments, the sample of cuttings can be extracted from drilling fluid that returns to the surface (for example, by a shaker). Optionally, the cuttings can be cleaned, dried, and/or otherwise prepared for analysis.

In block 1403, the sample of cuttings of block 1401 is loaded onto a sample tray. In embodiments, the cuttings can be loaded on the sample tray in a non-stacked configuration such that the cuttings are spatially distributed over the sample tray and do not lie on top of one another.

In block 1405, a WL image of the sample of cuttings on the tray is acquired with the white light source 211 turned on (and the UV source 201 off).

In block 1407, the white light source 211 is turned off.

In block 1409, a dark control image of the cuttings on the tray is acquired with both the WL source 211 off and the UV source 201 off.

In block 1411, a UV image of the sample of cuttings on the tray is acquired with the UV source 201 turned on (and the WL source 211 off).

In block 1413, the dark control image of 1409 can be used to subtract the contribution of ambient light from the UV image of 1411.

In block 1415, the WL image of 1405 is input to a machine learning (ML) model that is trained to detect pixels of all cuttings in the WL image (i.e., these pixels are part of any cutting in the WL image) and output a pixel count for all cuttings in the WL image.

In block 1417, the UV image of 1413 is input to another machine learning (ML) model that is trained to detect pixels of oil-bearing cuttings in the UV image (i.e., these pixels are part of any oil-bearing cutting in the UV image) and output a pixel count for the oil-bearing cuttings in the UV image.

In block 1419, a parameter representing the oil content of the cuttings (for example labeled "percentage of cuttings with oil) is determined based on the ratio of the pixel count for oil-bearing cuttings of block 1417 relative to the pixel count for all cuttings of block 1415.

In embodiments, the workflow can be configured to minimize any movement of cuttings sample while the white light image and UV image are acquired and between the acquisition times for both the white light image and UV image. In this manner, the cuttings remain in the same position in the field of view of the imaging system(s) while both the white light image and UV image are acquired.

In other embodiments, the acquisition of the dark control image of 1409 and the processing of the UV image using the dark control image of 1413 can be omitted. In this case, the UV image of 1411 can be input to the ML model in 1417 in order to detect pixels of oil-bearing cuttings in the UV image.

In still other embodiments, the operations of 1405 to 1413 of the workflow can be adapted to use separate WL and UV imaging systems to acquire the WL image and the UV image as described herein. In this case, the workflow can be configured to locate the cuttings in the same position in corresponding field of views of the separate imaging systems while both the white light image and UV image are acquired.

In yet other embodiments, image-pre-processing operations can be performed on the WL image input to the machine learning (ML) model in block 1405. Such image-pre-processing operations can provide for image correction (such as adjusting the brightness or color balance of the WL image or filtering the WL image), transformation of the color space of the WL image, or other desired image processing operations on the WL image. Similarly, image-pre-processing operations can be performed on the UV image input to the additional machine learning (ML) model in block 1407. Such image-pre-processing operations can provide for image correction (such as adjusting the brightness or color balance of the UV image or filtering the UV image), transformation of the color space of the UV image, or other desired image processing operations on the UV image.

Figure 15:
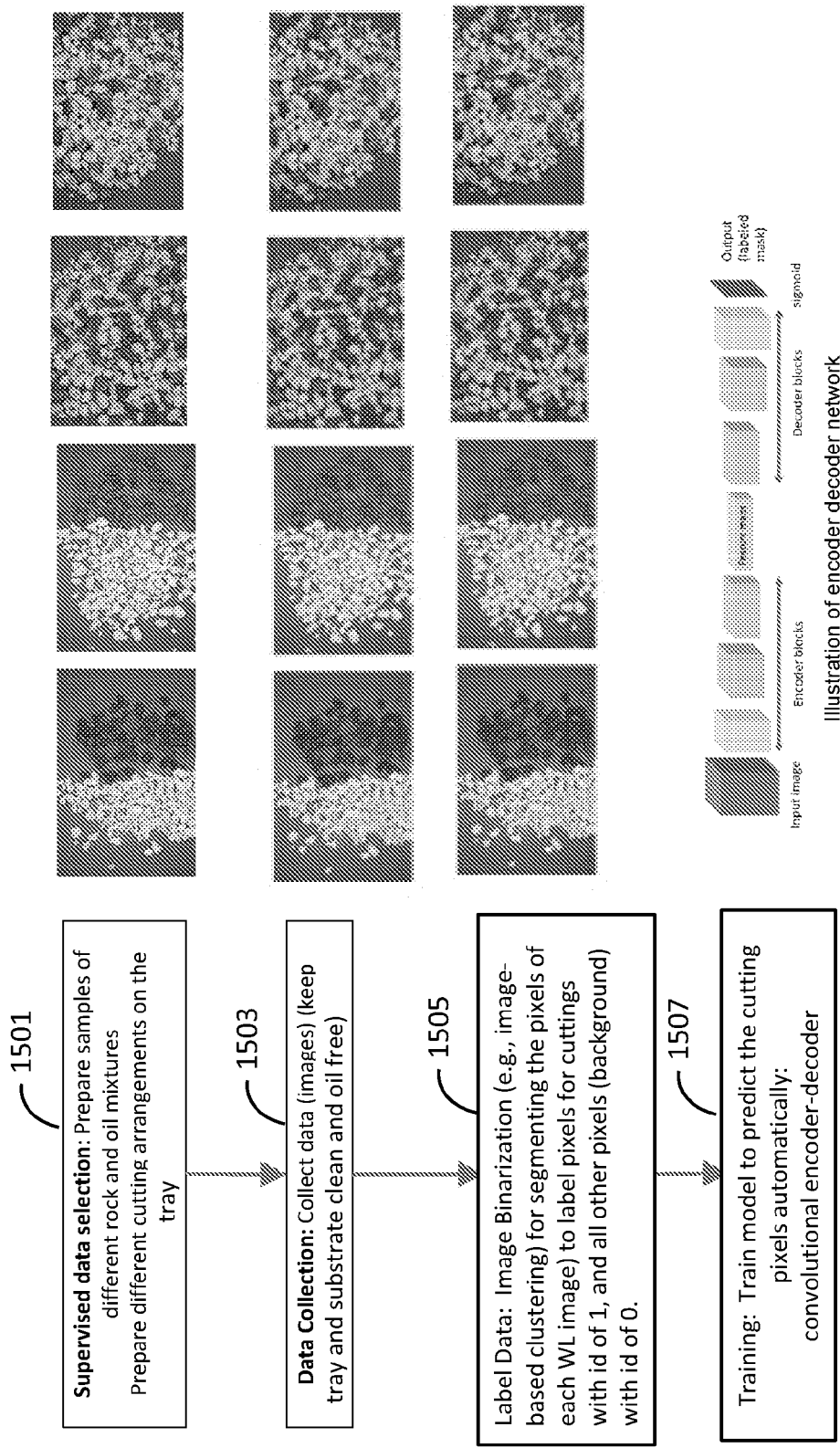
FIG. 15 depicts an exemplary workflow to train a machine learning (ML) model to detect pixels of all cuttings in an arbitrary WL image (i.e., these pixels are part of any cutting in the WL image).

FIG. 15 depicts an exemplary workflow to train a machine learning (ML) model to detect pixels of all cuttings in an arbitrary WL image (i.e., these pixels are part of any cutting in the WL image).

In block 1501, drill cuttings of different textures, colors, and oils of different API are selected. An image background is chosen to ensure good color contrast. Importantly, this step can be configured such that the drill cuttings of the selected images are in different arrangements to ensure variability in the data. Different background colors and textures may also be included to capture the deterioration aspect at different wellsite environments.

Block 1503 is a data collection operation that involves acquiring WL images of the cuttings of block 1501.

Block 1505 involves labeling the WL images, i.e., labeling pixels for all cuttings as "1" and background pixels (not part of a cutting) as "0" for each WL image. In embodiments, the labeling of the pixels of a given WL image can involve binarization of the given WL image. There are a number of possible methods that can be implemented for binarization of the WL image.

For example, the WL image can be transformed from the color space of the WL image as captured by the system 152, which is typically an RGB color space, to a Hue Saturation Value (HSV) color space. The transformed WL images that employ the HSV color space are referred to as HSV WL images herein. An RGB color space employs three components: red (which typically ranges from 0-255), green (which typically ranges from 0-255), and blue (which typically ranges from 0-255). The RGB color space is an additive one. In other words, red, green, and blue values (known as the three primary colors) are combined to reproduce other colors. For example, the color "red" can be represented as [R=255, G=0, B=0], "violet" as [R=238, G=130, B=238], etc. The HSV color space employs three components: hue (which typically ranges 0 to 360° and represents a color type); saturation (which typically ranges from 0 to 100% and represents the intensity of the color; and value (which typically ranges from 0 to 100% and represents the brightness of the color). The HSV color space is a nonlinear transformation of the RGB color space. In other words, color is not defined as a simple combination (addition/subtraction) of primary colors but as a mathematical transformation. The resulting HSV WL image (or for one or more components or channels H, S or V of the HSV WL image) can be processed by a suitable clustering or segmentation method (e.g., k-means clustering) that segments the pixels of the HSV WL image into two classes: a class "1" for pixels that are part of a cutting, and another class "0" for background pixels (not part of a cutting). In this manner, the pixels of class "1" correspond to all cuttings in the HSV WL image, and the pixels of class "0" correspond to background pixels (not part of a cutting) in the HSV WL image. The pixels for class "1" in the HSV WL image can be labeled as "1" and correspond to all cuttings in the HSV WL image, and the corresponding pixels in the WL image can be labeled as "1" and correspond to all cuttings in the WL image. The pixels for class "0" in the HSV WL image can be labeled as "0" and correspond to background pixels (not part of a cutting) in the HSV WL image, and corresponding pixels in the WL image can be labeled as "0" and correspond to background pixels in the WL image.

In another example, the WL image can be processed by a suitable edge-based segmentation method that segments the pixels of the WL image into two classes: a class "1" for pixels that are part of a cutting, and another class "0" for background pixels (not part of a cutting). Edge-based segmentation employs one or more edge detection operators for edge detection on the WL image and contour processing that localizes the pixels inside the edge boundaries and thus determines the pixels of the perimeter or edge boundary of each cutting. In the case that multiple cuttings touch one another (or overlie one another) in the WL image, the edge boundary for the multiple cuttings can be merged together as a single cutting. The pixels of the WL image within the edge boundary of a cutting are assigned to class "1", whereas the pixels of the WL image that are outside the edge boundary of a cutting are assigned to class "0". In this manner, the pixels of class "1" correspond to all cuttings in the WL image, and the pixels of class "0" correspond to background pixels (not part of a cutting) in the WL image. The pixels for class "1" in the WL image can be labeled as "1" and correspond to all cuttings in the WL image, and the pixels for class "0" in the WL image can be labeled as "0" and correspond to background pixels (not part of a cutting) in the WL image. Details of an exemplary edge-based segmentation method are described in U.S. Patent Publ. No. 2021/0248428, commonly assigned to assignee of the present application and herein incorporated by reference its entirety.

In other examples, other image binarization methods can be used to label the pixels of the WL image.

Block 1507 involves training the ML model using the WL images of block 1503 and the associated label data of block 1505. For example, the ML model can be a convolutional encoder-decoder machine learning algorithm. The basic trainable encoder-decoder network is topologically like a multi-layer convolutional neural network. The encoder module aggregates features at multiple levels along with the down-sampling of data to obtain coarse feature abstraction, and the decoder module up-samples these features to recover fine spatial classification. In general, the encoder takes an input image and generates a high-dimensional feature vector. On the other hand, the role of the decoder is to map this high-dimensional (but low resolution) feature vector to feature maps with the resolution of the original input, and thus achieve pixel-wise labeling. The building blocks of the encoder module includes convolution filters, element-wise non-linearity, max-pooling or strided convolution-based downsampling—the sequence of these steps builds a representation of the latent features. The decoder module includes upsampling and transpose convolution with "skip connections" of filters from the corresponding block of the encoder module. An example convolutional encoder-decoder neural network is shown in FIG. 15. In other embodiments, other machine learning models can be used as well.

Once the ML model is trained by the operations of FIG. 15, the trained ML model can be deployed for use in the interpretation of WL images, for example in block 1415 of FIG. 14. Such interpretation involves inputting an arbitrary WL image into the ML model. The ML model detects the pixels of all cuttings (both oil-bearing and non-oil-bearing cuttings) in the WL image, and outputs a pixel count for all cuttings in the WL image.

In other embodiments, image pre-processing operations can be performed on the WL image that is subject to image binarization in block 1505 and/or the WL image input to the machine learning (ML) model in block 1507 for training. Such image pre-processing operations can provide for image correction (such as adjusting the brightness or color balance of the WL image or filtering the WL image), transformation of the color space of the WL image, or other desired image processing operations on the WL image.

Figure 16:
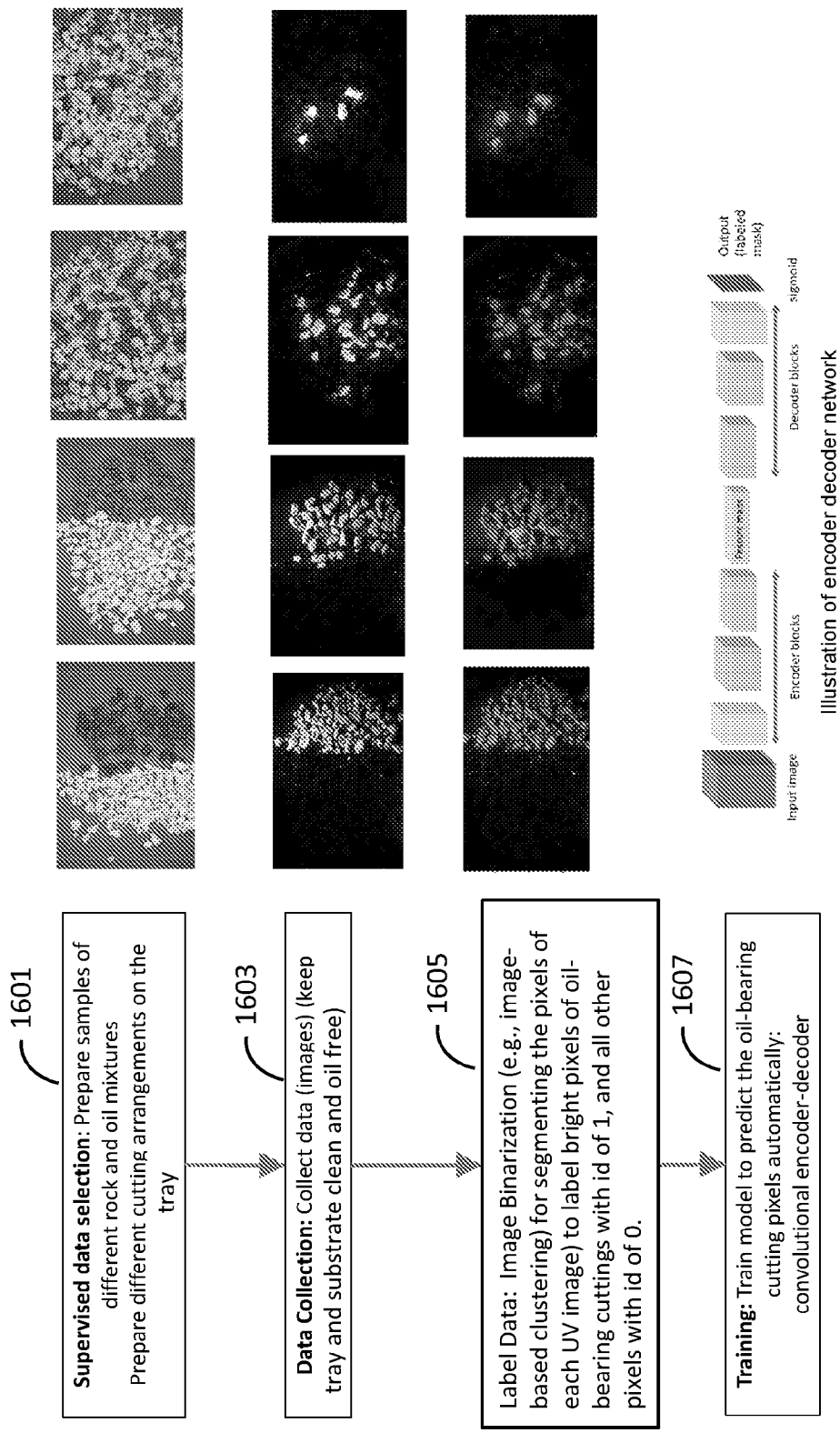
FIG. 16 depicts an exemplary workflow to train another machine learning (ML) model for use in detecting pixels of oil-bearing cuttings in an arbitrary UV image (i.e., these pixels are part of any oil-bearing cutting in the UV image).

FIG. 16 depicts an exemplary workflow to train another machine learning (ML) model for use in detecting pixels of oil-bearing cuttings in an arbitrary UV image (i.e., these pixels are part of any oil-bearing cutting in the UV image).

In block 1601, drill cuttings of different textures, colors, and oils of different API are selected. An image background is chosen to ensure good color contrast. Importantly, this step can be configured such that the drill cuttings of selected images are in different arrangements to ensure variability in the data. Different background colors and textures may also be included to capture the deterioration aspect at different wellsite environments. This step can be shared with the operations of block 1501 of FIG. 15.

Block 1603 is a data collection operation that involves acquiring UV images of the cuttings of block 1601.

Block 1605 involve labeling pixels of oil-bearing cuttings as "1" and other pixels (not part of an oil-bearing cutting and thus part of a non-oil-bearing cutting or background) as "0" for each UV image. In embodiments, the labeling of the pixels of a given UV image can involve binarization of the given UV image. There are a number of possible methods that can be implemented for binarization of the UV image.

For example, the UV image can be transformed from the color space of the UV image as captured by the system 152, which is typically an RGB color space, to a Hue Saturation Value (HSV) color space. The transformed UV images that employ the HSV color space are referred to as HSV UV images herein. The resulting HSV UV image (or for one or more components or channels H, S or V of the HSV UV image, such that the V channel of the HSV UV image) can be processed by a suitable clustering or segmentation method (e.g., k-means clustering) that segments the pixels of the HSV UV image into two classes: a class "1" for bright pixels that are part of oil-bearing cuttings, and another class "0" for all other pixels (which are part of non-oil-bearing cuttings or background pixels). In this manner, the pixels of class "1" correspond to all oil-bearing cuttings in the HSV UV image, and the pixels of class "0" correspond to non-oil-bearing cuttings and background pixels (not part of a cutting) in the HSV UV image. The pixels for class "1" in the HSV UV image can be labeled as "1" and correspond to oil-bearing cuttings in the HSV UV, and the corresponding pixels in the UV image can be labeled as "1" and correspond to oil-bearing cuttings in the UV image. The pixels for class "0" in the HSV UV image can be labeled as "0" and correspond to non-oil-bearing cuttings and background pixels in the HSV UV image, and corresponding pixels in the UV image can be labeled as "0" and correspond to non-oil-bearing cuttings and background pixels in the UV image.

In another example, the UV image can be processed by a suitable edge-based segmentation method that segments the pixels of the UV image into two classes: a class "1" for pixels that are part of an oil-bearing cutting, and another class "0" for pixels that are part of a non-oil-bearing cutting or background pixels (not part of a cutting). Edge-based segmentation employs one or more edge detection operators for edge detection on the UV image and contour processing that localizes the pixels inside the edge boundaries and thus determines the pixels of the perimeter or edge boundary of each cutting. In the case that multiple cuttings touch one another (or overlie one another) in the UV image, the edge boundary for the multiple cuttings can be merged together as a single cutting. The pixels of the UV image within the edge boundary of a cutting are assigned to class "1", whereas the pixels of the UV image that are outside the edge boundary of a cutting are assigned to class "0". In this embodiment, the pixels of class "1" correspond to oil-bearing cuttings in the UV image, and the pixels of class "0" correspond to non-oil-bearing cuttings and background pixels (not part of a cutting) in the UV image. The pixels for class "1" in the UV image can be labeled as "1" and correspond to oil-bearing cuttings in the UV image, and the pixels for class "0" in the WL image can be labeled as "0" and correspond to oil-bearing cuttings and background pixels (not part of a cutting) in the UV image. Details of an exemplary edge-based segmentation method are described in U.S. Patent Publ. No. 2021/0248428, commonly assigned to Assignee of the present application and incorporated by reference above its entirety.

In another example, the UV image can be processed by a suitable thresholding method that segments the pixels of the UV image into two classes: a class "1" for pixels that are part of an oil-bearing cutting, and another class "0" for pixels that are part of a non-oil-bearing cutting or background pixels (not part of a cutting). In embodiments, the threshold pixel values for the two classes can be determined from trial and error, or by Otsu's method as described by Nobuyuki Otsu (1979). "A threshold selection method from gray-level histograms". IEEE Trans. Sys. Man. Cyber. 9 (1): 62-66. Otsu's method is suitable for UV images that have a bimodal distribution of pixel values.

In other examples, other image binarization methods can be used to label the pixels of the WL image.

Block 1607 involves training the ML model using the UV images and the associated label data of block 1605. For example, the ML model can be a convolutional encoder-decoder machine learning algorithm. An example convolutional encoder-decoder neural network is shown in FIG. 16. In other embodiments, other machine learning models can be used as well.

Once the ML model is trained by the operations of FIG. 16, the trained ML model can be deployed for use in the interpretation of UV images, for example in block 1417 of FIG. 14. Such interpretation involves inputting the UV image into the ML model. The ML model detects the pixels of oil-bearing cuttings in the UV image. The ML model outputs a pixel count for the oil-bearing cuttings in the UV image.

In other embodiments, image pre-processing operations can be performed on the UV image that is subject to image binarization in block 1605 and/or the UV image input to the machine learning (ML) model in block 1607 for training. Such image pre-processing operations can provide for image correction (such as adjusting the brightness or color balance of the UV image or filtering the UV image), transformation of the color space of the UV image, or other desired image processing operations on the UV image.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer-readable media may thus comprise computer storage media. "Computer storage media" designates tangible media, and includes volatile and non-volatile, removable, and non-removable tangible media implemented for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above can be implemented as computer program logic for use with the computer processor. The computer program logic may be embodied in various forms, including a source code form or a computer-executable form. Source code may include a series of computer program instructions in a variety of programming languages (e.g., an object code, an assembly language, or a high-level language such as C, C++, or JAVA). Such computer instructions can be stored in a non-transitory computer-readable medium (e.g., memory) and executed by the computer processor. The computer instructions may be distributed in any form as a removable storage medium with accompanying printed or electronic documentation (e.g., shrink-wrapped software), preloaded with a computer system (e.g., on system ROM or fixed disk), or distributed from a server or electronic bulletin board over a communication system (e.g., the Internet or World Wide Web).

Although only a few example embodiments have been described in detail above, those skilled in the art will readily appreciate that many modifications are possible in the example embodiments without materially departing from this invention. For example, the methods and processes of the present disclosure can also be performed on organic matter isolated from the bulk formation sample in order to determine properties of the organic matter.

The methods and systems of the present disclosure provide advantages over the legacy methods and systems used for mud-logging activities.

First, the methods and systems of the present disclosure can employ a modular system design to target multiple potential applications. In particular, the combination of UV LED light-filter-camera/microscope provides a flexible (easily reconfigurable) design that allows for two modes of operations: (i) low UV power for open system and hence very small (and yet safe) physical barrier between the operator and UV source; and (ii) enclosure-based closed system for higher power UV light.

Second, the methods and systems of the present disclosure can employ a modular system design that provides for integration and automation of white light and UV imaging operations. In this design, the same sensor (camera/microscope) is used to capture both WL and UV images of drill cuttings while eliminating the need to move the sample. This enables pixel overlap between the image sequences, which is necessary for quantitative analysis.

Third, the methods and systems of the present disclosure can employ a modular system design that uses a UV LED instead of a fluorescent bulb or other fluorescent light source. The UV LED is a solid-state electronic device that does not contain mercury (which is part of fluorescent light sources). This improves on multiple HSE factors including mercury-free system, lower energy consumption, and reduced heat release, especially in hydrocarbon environments.

Fourth, the methods and systems of the present disclosure provide for improved data quality in the images of the drill cuttings, which leads to better performance of machine learning methods for accurate pixel-level oil detection in cuttings. For example, the images of the drill cuttings of FIGS. 3 to 6 suggest that the methods and systems can be a key lever to implement data-centric engineering pipelines for wellsites and facilitate the estimation of key sustainability indicators (such as oil detection and water quality measurements). Indeed, data quality is the most important factor for automation of measurements, machine learning-based detection, and ease of interpretation of results. The methods and systems of the present disclosure fill an important gap in data-centric pipelines using modern machine learning algorithms (in particular, deep learning methods) and apply the machine learning algorithms to challenging field environments with a high variability of rock and fluid samples. By enabling high-quality data acquisition, the methods and systems of the present disclosure make machine learning models easy to implement and also improve detection performance.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of characterizing oil content in drill cuttings, the method comprising:
   capturing at least one white light image of drill cuttings illuminated by white light;
   capturing at least one ultraviolet (UV) image of the drill cuttings based on fluorescence emission arising from illumination by UV radiation;
   capturing a dark control image of the drill cuttings;
   configuring a data processing system to perform operations that include:
   i) processing the at least one white light image of the drill cuttings illuminated by white light to determine a first pixel count for all drill cuttings;
   ii) processing the at least one UV image based on fluorescence emission to determine a second pixel count for oil-bearing drill cuttings; and
   iii) determining a parameter representing oil content of the drill cuttings based on the first pixel count and the second pixel count; and
   placing perforations in a wellbore, geosteering a drill bit, or both, based on the parameter.

2. The method of claim 1, wherein:
   the data processing system is configured to determine the parameter representing oil content of the drill cuttings based on the ratio of the second pixel count over the first pixel count.

3. The method of claim 1, wherein:
   the data processing system employs a first machine learning model to determine the first pixel count for all drill cuttings; and
   the data processing system employs a second machine learning model to determine the second pixel count for oil-bearing drill cuttings.

4. The method of claim 3, wherein:
   the first machine learning model is trained to determine the first pixel count for all drill cuttings from images of drill cuttings of different textures, colors, and oils of different API and associated label data; and
   the second machine learning model is trained to determine the second pixel count for oil-bearing drill cuttings from images of drill cuttings of different textures, colors, and oils of different API and associated label data.

5. The method of claim 3, wherein:
   the first machine learning model is trained to determine the first pixel count for all drill cuttings with label data derived from binarization of white light images of drill cuttings.

6. The method of claim 5, wherein:
   the binarization of white light images employs i) clustering of hue, saturation or value image data obtained by transforming color space of the white light images, or ii) edge-based segmentation of the white light images.

7. The method of claim 3, wherein:
the second machine learning model comprises a neural network trained on a set of binarized UV images to determine the second pixel count for oil-bearing drill cuttings in response to receiving a non-binarized UV.

8. The method of claim 7, wherein:
binarization of the UV images employs i) clustering of hue, saturation or value image data obtained by transforming color space of the UV images, or ii) edge-based segmentation of the UV images, or iii) thresholding of the UV images.

9. The method of claim 3, wherein:
the first machine learning model comprises a convolutional encoder-decoder neural network trained to determine the first pixel count for all drill cuttings of a given white light image of drill cuttings; and/or
the second machine learning model comprises a convolutional encoder-decoder neural trained to determine the second pixel count for oil-bearing drill cuttings of a given UV image of drill cuttings.

10. The method of claim 3, comprising training the second machine learning model on a set of binarized UV images to predict pixel counts of oil bearing drill cuttings in respective UV images.

11. The method of claim 3, wherein the second machine learning model is a supervised machine learning model.

12. The method of claim 3, wherein the first machine learning model is configured to:
generate a feature vector based on the at least one white light image;
map the feature vector to a feature map; and
determine a binary label for each pixel of the at least one white light image.

13. The method of claim 1, wherein:
the at least one white light image of drill cuttings illuminated by white light and the at least one UV image based on fluorescence emission are captured by an imaging system having a white light source and UV source configured to illuminate a sample volume and a camera system configured to acquire white light images or UV images of drill cuttings located in the sample volume and illuminated by either the white light source or the UV source, respectively, without moving the drill cuttings.

14. The method of claim 1, wherein:
the at least one white light image of drill cuttings illuminated by white light and the at least one UV image based on fluorescence emission are captured by a white light imaging system and UV imaging system that are separate and distinct from one another.

15. The method of claim 1, wherein processing the at least one UV image comprises subtracting a contribution of ambient light from the at least one UV image using the dark control image.

16. The method of claim 13, wherein:
the UV radiation is produced by a UV source that includes a UV light-emitting diode.

17. The method of claim 16, wherein:
the UV source is configured to illuminate the sample volume with at least one predefined UV wavelength band, wherein the at least one predefined UV wavelength band interacts with crude oil bound to drill cuttings located in the sample volume to cause fluorescence emission of photons in the visible region of the electromagnetic spectrum.

18. The method of claim 16, wherein:
the UV source further includes an optical bandpass filter configured to transmit UV radiation within at least one predefined UV wavelength band and block other UV wavelength bands, wherein the at least one predefined UV wavelength band interacts with crude oil bound to drill cuttings located in the sample volume to cause fluorescence emission of photons in the visible region of the electromagnetic spectrum.

19. The method of claim 18, wherein:
the optical bandpass filter is configured to transmit UV radiation in a wavelength band centered around 365 nm and substantially block transmission of UV radiation for wavelengths outside the wavelength band for transmission;
the wavelength band for transmission of the optical bandpass filter extends over a narrow UV wavelength range of 100 nm or less; and/or
the optical bandpass filter is configured to block visible light in the wavelength band between 400 nm and 700 nm.

* * * * *